United States Patent [19]

Takemoto et al.

[11] Patent Number: 4,567,418
[45] Date of Patent: Jan. 28, 1986

[54] OPERATION CONTROL APPARATUS FOR ROBOTS

[75] Inventors: Akinobu Takemoto; Kenzo Takeichi, both of Tochigi; Yuhiko Yabe, Kasukabe; Yoshiaki Yoshikawa, Tochigi, all of Japan

[73] Assignee: Hitachi, Ltd., Tokyo, Japan

[21] Appl. No.: 640,884

[22] Filed: Aug. 15, 1984

[30] Foreign Application Priority Data

Aug. 29, 1983 [JP] Japan .................. 58-156242

[51] Int. Cl.$^4$ ............................................. G05B 19/40
[52] U.S. Cl. ..................... 318/685; 318/696; 118/109
[58] Field of Search ............... 318/685, 696; 118/109

[56] References Cited
U.S. PATENT DOCUMENTS 4,230,067 10/1980 Iwamoto et al. .................. 118/109
4,476,421 3/1984 Moriguchi .......................... 318/696

Primary Examiner—William M. Shoop, Jr.
Assistant Examiner—Saul M. Bergman
Attorney, Agent, or Firm—Antonelli, Terry & Wands

[57] ABSTRACT

In a control apparatus controlling point-to-point movement of arms of a robot, stepping motors are used to drive the shafts of the robot arms respectively, and motor drivers drive the stepping motors according to a 1-2-phase excitation mode in a low speed range but according to a 2-phase excitation mode in an intermediate and a high speed range.

5 Claims, 7 Drawing Figures

OPERATION CONTROL APPARATUS FOR ROBOTS

This invention relates to the control apparatus for operation of robots, and more particularly to a robot operation control apparatus using stepping motors.

In a robot of the point-to-point movement controlled type, stepping motors are used for controlling a plurality of shafts of the robot. A robot using such stepping motors is disclosed in, for example, an unpublished U.S. Pat. Application Serial No. 555,616 which is an earlier application.

A 2-phase excitation method for stepping motors is commonly known. However, this 2-phase excitation method has been disadvantageous in that the operation of the stepping motors tends to become unstable in a low speed range due to insufficient torque, and the necessity for selection of a high starting frequency to avoid resonance results in generation of great noise and vibration.

A 1-2-phase excitation method is also commonly known as a means for exciting such stepping motors. According to this 1-2-phase excitation method, the torque in an intermediate speed range is smaller than that in the 2-phase excitation method, but the resolution is higher than that in the 2-phase excitation method. This 1-2-phase excitation method has been defective in that the angular velocity is only about one-half that in the 2-phase excitation method when the excitation phase change-over rate is the same. Thus, the 1-2-phase excitation method has had the problem of an insufficient rotation speed of the stepping motors when the robot is controlled by a microcomputer.

Therefore, the problem of the insufficient rotation speed of the stepping motors arises inevitably when the robot operation is controlled by a microcomputer having a limited processing speed.

It is therefore an object of the present invention to provide a robot operation control apparatus which can operate a robot of the point-to-point movement controlled type at a high speed with reduction of noise and vibration.

In accordance with the present invention which attains the above object, the operation of a robot is controlled while changing over between the 1-2-phase excitation mode and the 2-phase excitation mode for excitation of the stepping motors. That is, the present invention is featured by the fact that the stepping motors are excited according to the 1-2-phase excitation mode in a low speed range (for example, about 0 rpm-60 rpm) in which the torque is larger, the resolution is higher and the stepping motors are less affected by resonance than the 2-phase excitation mode, while, the stepping motors are excited according to the 2-phase excitation mode in an intermediate speed range (for example, about 60 rpm-300 rpm) and a high speed range (for example, about 300 rpm-500 rpm) in which the torque is higher than that in the 1-2-phase excitation mode and the maximum angular velocity increases when a microcomputer is used for the control.

The present invention will be apparent from the following detailed description taken in conjunction with the accompanying drawings, in which.

Figure 1:
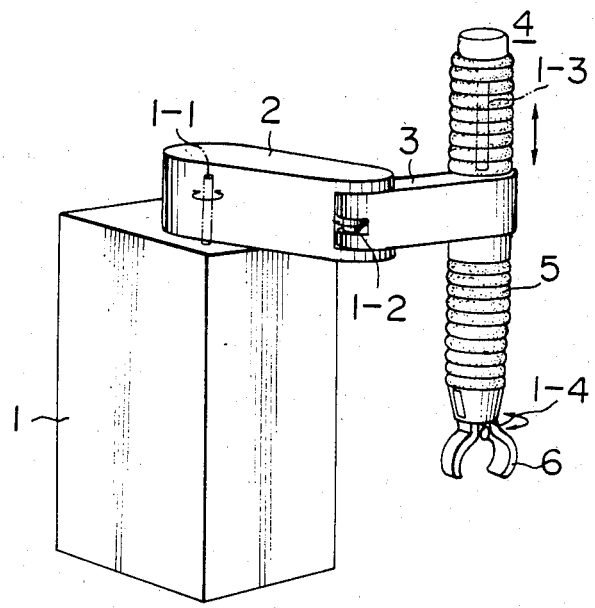
FIG. 1 is a perspective external view of a scalar type robot controlled by the apparatus of the present invention.

FIG. 1 is a perspective view showing the external appearance of a robot whose operation is controlled by an embodiment of the control apparatus according to the present invention. Referring to FIG. 1, a first arm 2 is horizontally rotatably mounted on a cabinet 1 accommodating control sections. The first arm 2 is rotated (in directions as shown by the arrows) by a first shaft 1—1 driven by an associated driver (not shown). A driver (not shown) for driving a second arm 3 is disposed in the first arm 2, and a second shaft 1-2 is driven by this driver to cause rotation of the second arm 3 (in directions as shown by the arrows). A third arm 4 penetrating the second arm 3 is supported by a supporter (not shown) so as to be vertically movable (in directions as shown by the arrows). A third shaft (a vertically moving shaft) 1-3 causing the vertical movement of the third arm 4 is driven by an associated driver (not shown). The third arm 4 is covered with a bellows member 5. A gripper 6 is mounted on the lower end of the third arm 4 for transferring articles such as parts. The gripper 6 is rotated by a fourth shaft 1-4 (in directions as shown by the arrows).

Figure 2:
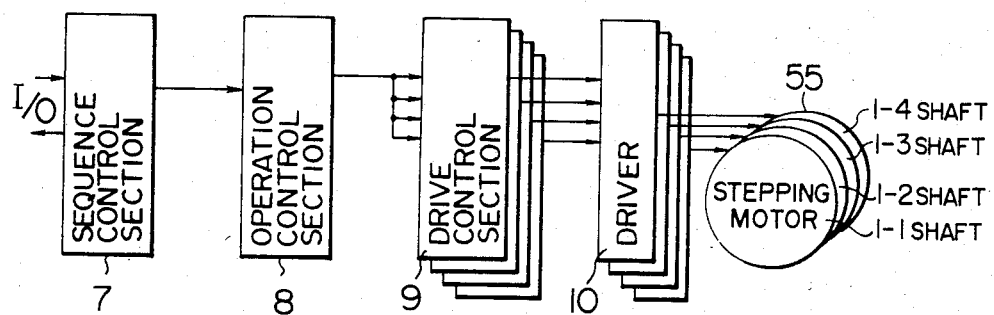
FIG. 2 is a diagrammatic view of an embodiment of the robot operation control apparatus according to the present invention.

FIG. 2 shows the structure of the control apparatus of the present invention which actuates the arms shown in FIG. 1. Referring to FIG. 2, a sequence control section 7 instructs the next target points of the arms according to the sequence previously taught. An operation control section 8 stores, for each individual shaft, the number of absolute pulses representing the point taught by the sequence control section 7. When each individual arm is to be moved to the point taught by the sequence control section 7, the operation control section 8 computes the difference between the number of absolute pulses representing the target point and that representing the present point to generate a signal indicative of the difference and stores thereafter the number of target-point representing pulses as the number of present-point representing pulses. Driver control sections 9 are provided independently for the individual shafts respectively and generate phase outputs in response to the numbers of pulses applied from the operation control section 8, so that each of stepping motors 55 associated with the individual shafts 1—1 to 1-4 respectively can smoothly rotate under the acceleration and deceleration control according to a predetermined curve. Excitation drivers 10 convert the phase outputs from the driver control sections 9 into powers great enough for causing rotation of the stepping motors 55, thereby causing rotation of the individual shafts 1—1 to 1-4 over the specified angles, respectively.

In the control apparatus shown in FIG. 2, a single-chip microcomputer having limited functions is employed to constitute each of the sequence control section 7, operation control section 8 and driver control sections 9, and these microcomputers are directly connected to effect distributed operation control. Especially, the phase outputs from the driver control sections 9 are obtained by the use of independent single-chip microcomputers provided for the individual shafts 1—1 to 1-4 respectively. Since the first, second, third and fourth shafts 1—1, 1-2, 1-3 and 1-4 are entirely the same in their control circuit arrangement, description will be directed to the first shaft 1—1 only.

Figure 3A:
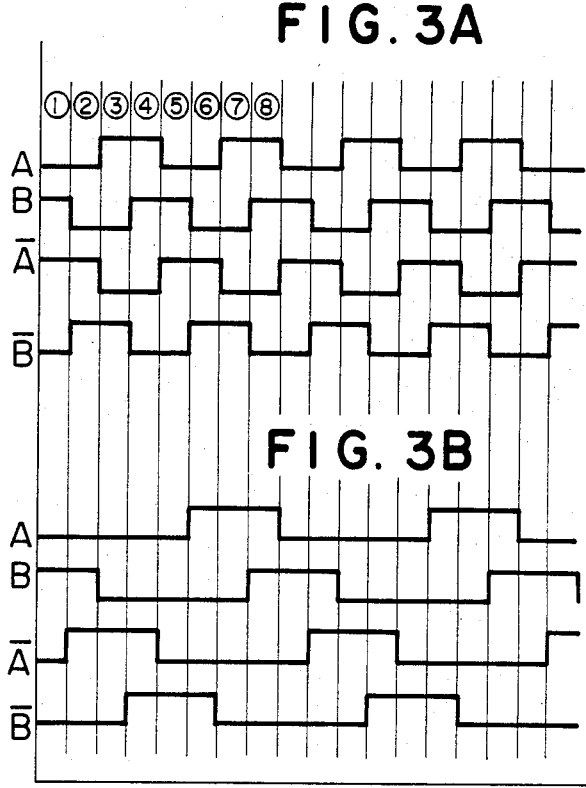
FIGS. 3A and 3B show signal waveforms of excitation inputs applied for excitation of the robot's first shaft drive motor according to the 2-phase excitation mode and 1-2-phase excitation mode respectively.
Figure 3B:
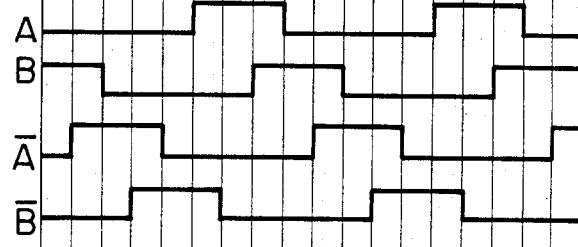

The motor 55 associated with the first shaft 1—1 is a 2-phase stepping motor, and there are four excitation input signals A, B, $\overline{A}$ and $\overline{B}$. FIGS. 3A and 3B show the waveforms of these excitation input signals applied for excitation of the first shaft drive motor 55 according to the 2-phase excitation mode and 1-2-phase excitation mode respectively. That is, FIGS. 3A and 3B illustrate the sequence with which the state of excitation of the 2-phase stepping motor 55 changes with time.

Referring to FIG. 3A, the inputs to the 2-phase stepping motor are such that the signals B and $\overline{A}$ have the same phase in the time zone ①, the signals $\overline{A}$ and $\overline{B}$ have the same phase in the time zone ②, the signals $\overline{B}$ and A have the same phase in the time zone ③, and the signals A and B have the same phase in the time zone ④.

In the next time zone ⑤, the signals B and $\overline{A}$ have the same phase as in the case of the time zone ①. In the succeeding time zones, the inputs are similar to those above described. Thus, according to the 2-phase excitation mode, two phases of the stepping motor are always excited.

Figure 4:
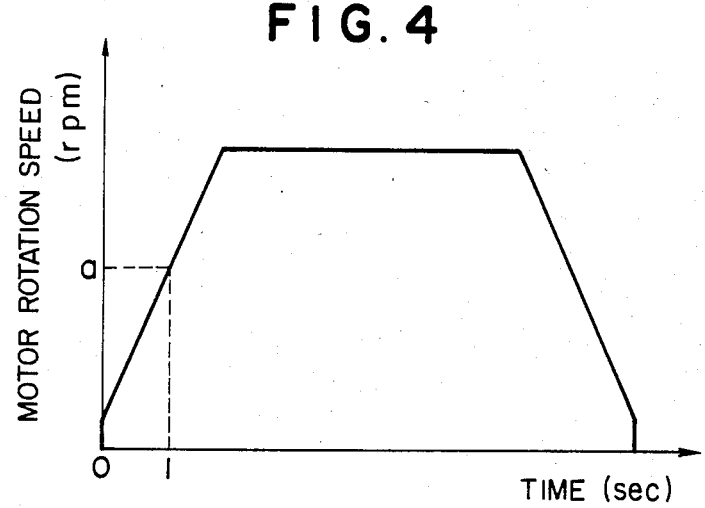
FIG. 4 shows the motor rotation speed vs. time curve to illustrate how the rotation speed of the pulse motor changes relative to time when the motor is accelerated and then decelerated.
Figure 5:
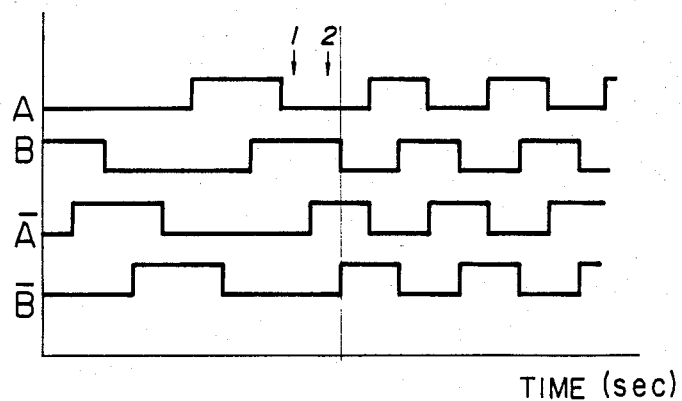
FIG. 5 shows signal waveforms at the point of change-over between the 1-2-phase excitation mode and the 2-phase excitation mode.
Figure 6:
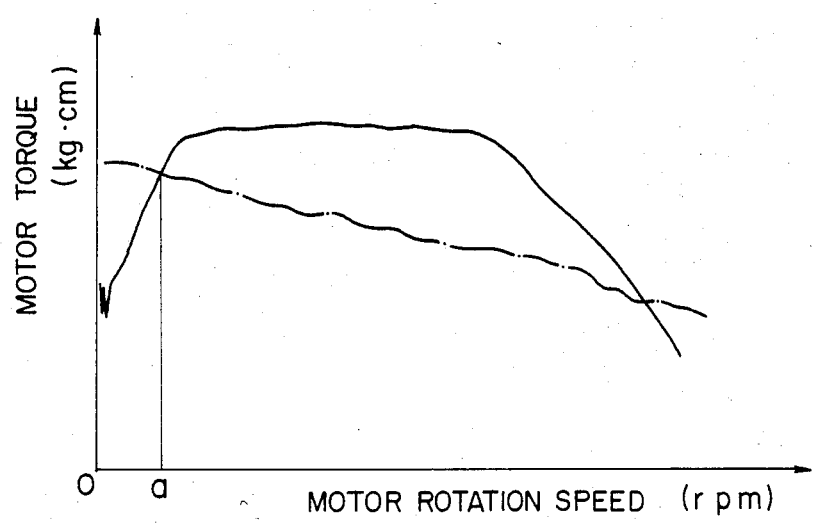
FIG. 6 shows the motor torque vs. rotation speed curve to illustrate how the torque of the robot's first shaft drive motor changes relative to the motor rotation speed.

Referring to FIG. 3B, the signal B only is applied to the stepping motor in the time zone ①, the signals B and $\overline{A}$ are applied in the time zone ②, the signal $\overline{A}$ only is applied in the time zone ③, and the signals $\overline{A}$ and $\overline{B}$ are applied in the time zone ④. FIG. 4 shows how the rotation speed of the stepping motor changes relative to time when the motor is accelerated from a standstill and is then decelerated to stop. FIG. 5 shows the phase or phases excited at the time of change-over between the 1-2 phase excitation mode and the 2-phase excitation mode. After starting, the motor is initially accelerated according to the 1-2-phase excitation mode until a point a shown in FIGS. 6 and 4 is reached at which the motor torque according to the 2-phase excitation mode becomes larger than that according to the 1-2-phase excitation mode, as shown by the solid curve in FIG. 6. It is supposed now that, at time 1 corresponding to the motor rotation speed a in FIG. 4, the state of the excited phase is represented by the arrow 1 in FIG. 5, that is, the phase B only is excited in this case. The state of 1-phase excitation in the 1-2-phase excitation mode continues until time represented by the arrow 2 in FIG. 5 is reached at which two phases, B and $\overline{A}$ are excited. After the time 2 in FIG. 5, the 1-2-phase excitation mode is changed over to the 2-phase excitation mode, and excitation according to the latter mode continues. The one-dot chain curve in FIG. 6 represents the relation between the torque and the rotation speed of the motor the 1-2-phase excitation mode. It will thus be seen that the change-over from the 1-2-phase excitation mode to the 2-phase excitation mode is not effected in the state of 1-phase excitation but effected in the state of 2-phase excitation, so that the former mode can be smoothly changed over to the latter mode.

It will be understood from the foregoing description that the change-over between the 1-2-phase excitation mode and the 2-phase excitation mode is effected at a suitable point, so that the problem of insufficient torque in a low speed range as seen in FIG. 6 and the problem of increased vibration and noise inherent in the excitation according to the 2-phase excitation mode can be solved, and, also, the problem of insufficient torque in an intermediate and a high speed range inherent in the excitation according to the 1-2-phase excitation mode can be avoided. Although FIG. 6 shows that the torque drops remarkably in the high speed range according to the 2-phase excitation mode, the motor rotation speed corresponding to such greatly reduced torque can be excluded from the actual range of the operating rotation speed by means such as voltage control means without raising any special problem. The use of the 1-2-phase excitation mode in the low speed range is advantageous in that the resolution of the stop position is about two times as high as that attained by the 2-phase excitation mode and provides a good result for attainment of the desired positional accuracy. Further, by virtue of the fact that the use of the 2-phase excitation mode in the high speed range provides an angular velocity which is about two times as high as that of the 1-2-phase excitation mode at the same excitation phase frequency, the stepping motors can be rotated at high speeds in a system including processing means such as microcomputers operating with a limited processing speed, and the operating speed of the robot can be effectively increased.

We claim:

1. A robot operation control apparatus having control signal generating means and driver means for driving arms of a robot in a predetermined point-to-point movement in response to a control signal of said control signal generating means, wherein each robot arm is provided with a stepping motor and said driver means, said arm being driven by said stepping motor, said stepping motor being excited by said driver means, said control signal generating means being associated with each said driver means, said control signal generating means being provided for controlling each said driver means so that said driver means excites said stepping motor in 1-2-phase excitation mode at a predetermined low-speed range and in 2-phase excitation mode at a predetermined intermediate and high speed ranges, wherein a change from the 1-2-phase excitation mode to the 2-phase excitation mode occurs when two phases of said stepping motor are excited at a same time.

2. A robot operation control apparatus as claimed in claim 1, wherein said control signal generating means includes a single-chip microcomputer.

3. A rotor operation control apparatus as claimed in claim 1, wherein said stepping motor is 2-phase stepping motor.

4. A robot operation control apparatus as claimed in claim 2, wherein said stepping motor is 2-phase stepping motor.

5. A robot operation control apparatus according to any one of claims 1 to 4, wherein at least one horizontal arm and shafts of a vertical arm coupled to said horizontal arm, respectively, are driven by stepping motors.

* * * * *